United States Patent [19]
Petrides et al.

[11] Patent Number: 5,746,156
[45] Date of Patent: May 5, 1998

[54] CONVERTIBLE BIRD BOX

[75] Inventors: George H. Petrides, Bethesda, Md.; Katherene J. Kirchner, McLean, Va.

[73] Assignee: Wild Bird Centers of America, Inc., Glen Echo, Md.

[21] Appl. No.: 601,439

[22] Filed: Feb. 14, 1996

[51] Int. Cl.[6] .................................... A01K 31/00
[52] U.S. Cl. ............................ 119/428; 119/430
[58] Field of Search ...................... 119/428–435; 446/476

[56] References Cited

U.S. PATENT DOCUMENTS

| | | | |
|---|---|---|---|
| 1,587,804 | 6/1926 | Stein | 119/428 |
| 2,392,532 | 1/1946 | Hyde | 119/429 |
| 3,053,226 | 9/1962 | Dunn | 119/428 |
| 3,316,883 | 5/1967 | Johnson | 119/428 |
| 5,172,651 | 12/1992 | Finn | 119/428 |

*Primary Examiner*—Robert A. Clarke
*Assistant Examiner*—Ki Yong O
*Attorney, Agent, or Firm*—Foley & Lardner

[57] ABSTRACT

A convertible bird box as illustrated has upper and lower entrance openings located in a pivoting front wall panel to create an upper roosting perch and a lower nesting location. A closure having a single opening rotates between the upper and lower entrance openings to selectively create a nesting box and a roosting box. The invention further describes a method for selectively forming a winter roosting box and a spring nesting box.

17 Claims, 3 Drawing Sheets

CONVERTIBLE BIRD BOX

BACKGROUND OF THE INVENTION

1. Field of the Invention

The invention relates to a bird box, more particularly to a bird box which can be converted from a winter roosting box to a spring nesting box.

2. Description of Related Art

Bird boxes can be designed for a specific purpose, namely, the typical box for roosting, and alternatively the typical box for providing nesting facilities. This often requires different boxes for different times of the year.

Prior convertible bird boxes have had a single entrance hole or opening in one wall of the housing, the opening being located vertically off-center. In this prior design the wall must be removed from the housing, rotated and replaced so that the entrance is either toward the upper portion of the housing to create a nesting box or toward the lower portion to create a roosting box.

SUMMARY AND OBJECTS OF THE INVENTION

It is therefore an object of the instant invention to provide a bird box which is convertible from a winter roosting box to a spring nesting box, in other words a box for all seasons which has two entrance openings.

The convertible bird box as illustrated has upper and lower entrance openings located in a pivoting front wall panel in order to create an upper roosting perch and a lower nesting location. A closure having a single opening rotates between the upper and lower entrance openings to selectively provide a nesting box or a roosting box. The invention further describes a method for selectively forming a winter roosting box and a spring nesting box.

BRIEF DESCRIPTION OF THE DRAWINGS

The above and other objects will become apparent from the following description, taken with the accompanying drawings wherein.

DETAILED DESCRIPTION OF THE INVENTION

Figure 1:
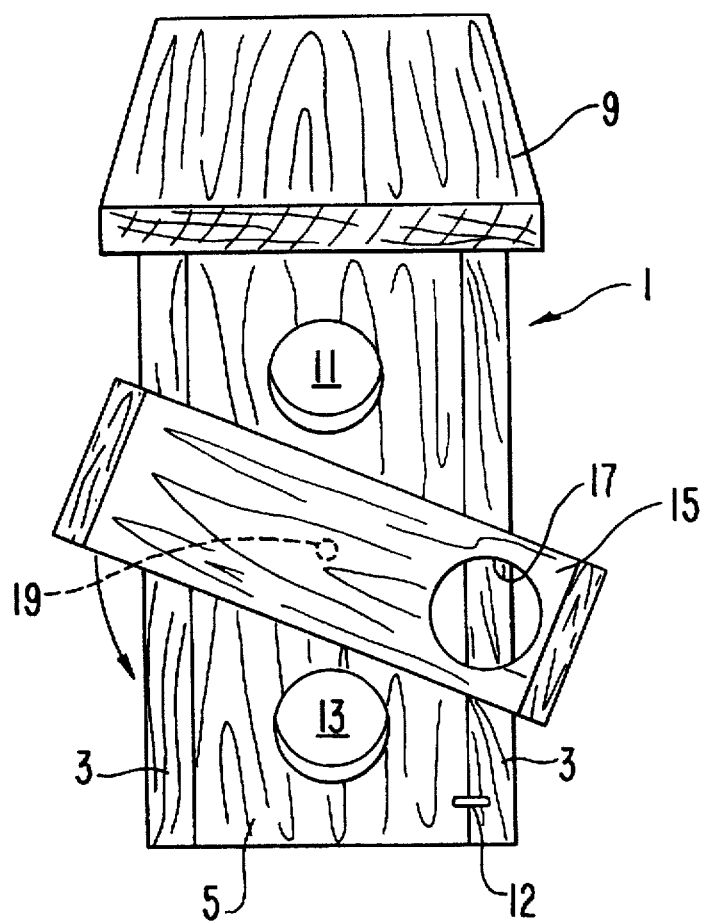
FIG. 1 is a front elevational view of a convertible bird box.
Figure 2:
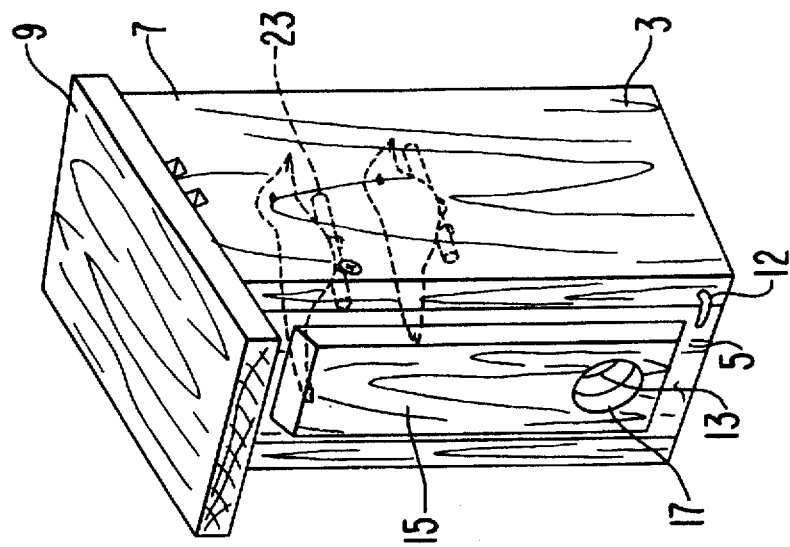
FIG. 2 is a perspective view of the bird box in the form of a nesting box.
Figure 3:
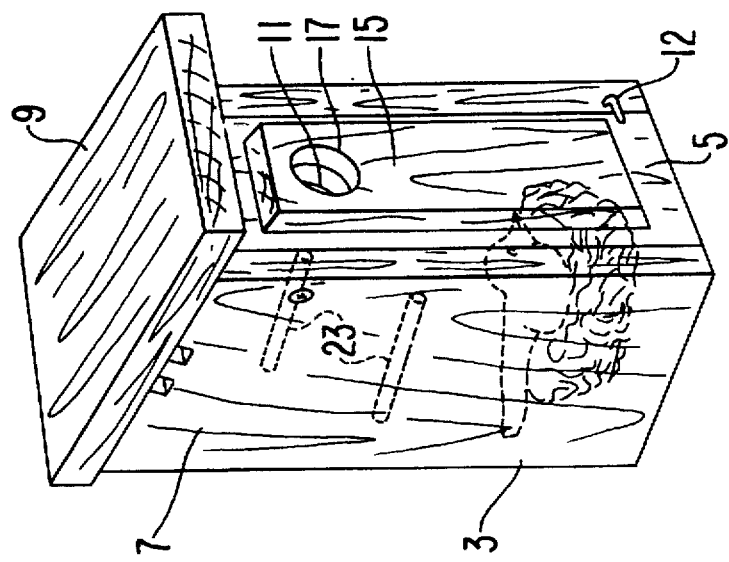
FIG. 3 is a perspective view of the bird box in the form of a roosting box.

A convertible bird box 1 as seen in FIGS. 1–3 is formed by a pair of sidewalls 3, a front wall panel 5, a rear wall 7 a floor 8 and a sloping roof 9. The bird box is preferably wood; however, other materials may be acceptable.

Figure 5:
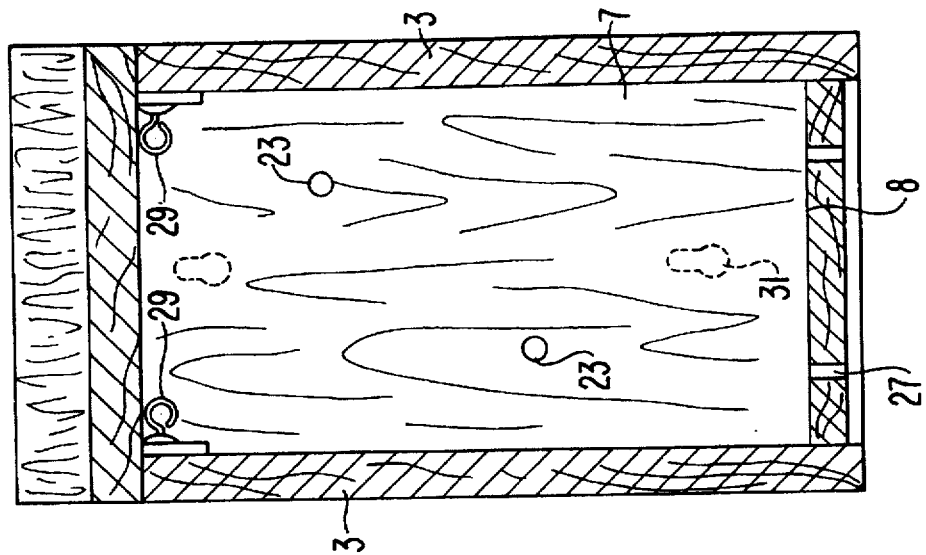
FIG. 5 is a cross-sectional view taken along lines 5—5 in FIG. 4.
Figure 4:
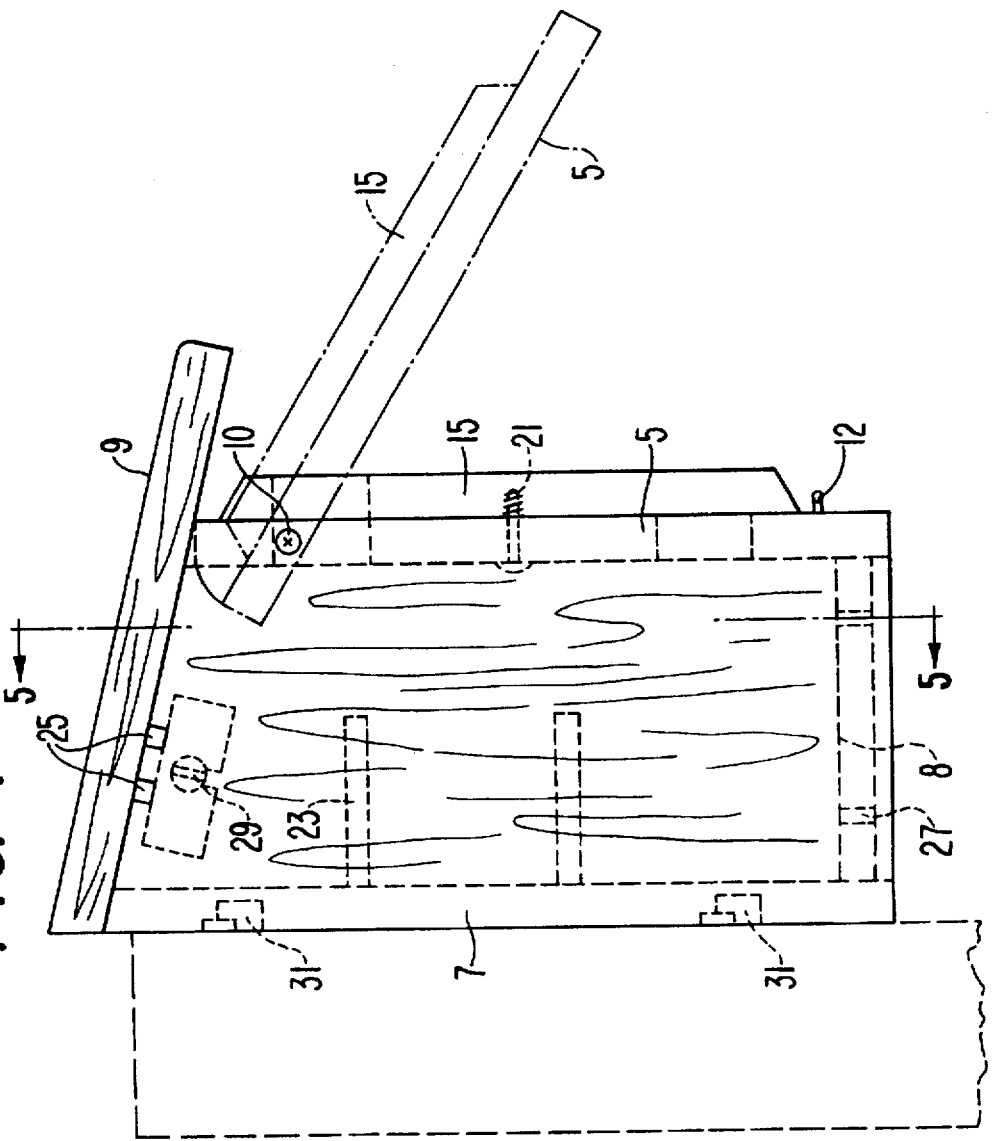
FIG. 4 is a side elevational view of the bird box illustrating the front wall panel pivoted outwardly in dotted lines.

As seen in FIGS. 4 and 5, the front wall panel 5 pivots open on a pair of screws 10 to facilitate cleaning of the interior of the bird box. A rotating lock 12, seen best in FIGS. 1–3, holds the panel in a closed position.

The front wall panel 5 includes an upper entrance opening 11 and a lower entrance opening 13. A closure 15 in the form of a plate member having an opening 17 therein is rotatable about an axis 19 formed by a screw 21 located midway between openings 11 and 13. The opening 17 is selectively alignable with either the upper entrance opening 11 or the lower entrance opening 13 to simultaneously open one opening and close the other.

As seen in FIGS. 2–5, a pair of perches 23 are positioned in the upper portion of the housing and extend inwardly from the rear wall 7.

The bird box as seen in FIG. 2 is a spring nesting box wherein openings 17 and 11 have been aligned. As pictured in FIG. 3, the openings 13 and 17 are aligned at the bottom for ingress and egress and facilitates the utilization of the unit as an ideal winter roosting box. Depending upon the time of year and the nesting habits of the birds utilizing the box, the closure is rotated to the preferred configuration.

FIGS. 4 and 5 illustrate various other aspects of the invention; including: a plurality of ventilation openings 25 on each of the side walls 3; drainage openings 27 in the floor 8; hooks 29 for bird food (also on each side wall) and mounting slots 31 on the back wall.

Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A convertible bird box, comprising:
    a) a housing having a floor, walls and a roof,
    b) a pair of entrance openings in a wall of the housing, and
    c) a closure selectively opening one entrance opening and simultaneously closing the other entrance opening.

2. The bird box of claim 1, including a pair of perches positioned on a wall opposite the wall containing the entrance openings.

3. The bird box of claim 1, including an opening in the closure.

4. The bird box of claim 3, wherein the opening in the closure is selectively alignable with the entrance openings.

5. The bird box of claim 1, including at least one perch in the housing.

6. The bird box of claim 3, wherein the closure rotates about an axis located between the entrance openings.

7. The bird box of claim 1, wherein one entrance opening is located at a lower location in the housing and the other entrance opening is located at an upper location.

8. The bird box of claim 1, wherein the entrance openings are located on a pivoting front wall panel.

9. The bird box of claim 8, including a lock retaining the panel in a closed position.

10. The bird box of claim 1, including drain and ventilation openings formed in the housing.

11. A convertible bird roosting and nesting box, comprising:
    a) a housing having a floor, walls and a roof,
    b) an upper entrance opening and a lower entrance opening in a wall,
    c) an upper roosting perch between the walls and above the floor and a lower nesting location on the floor, and
    d) a closure selectively opening one entrance opening and simultaneously closing the other entrance opening in accordance with whether use of the box for roosting or nesting is being encouraged.

12. The bird box of claim 11, including an opening in the closure selectively alignable with each of the entrance openings.

13. The bird box of claim 12, wherein the closure permits entry through the lower entrance opening when roosting is to be encouraged, and through the upper entrance opening when nesting is to be encouraged.

14. The bird box of claim 13, wherein the entrance openings are located on a pivoting front panel and the closure rotates about an axis between the entrance openings.

15. A method of selectively converting a winter roosting box to a spring nesting box, and vice-versa, comprising:
   a) forming a lower entrance hole and an upper entrance hole in a housing having a floor, walls and a roof,
   b) placing at least one perch at an upper location in the housing, and
   c) selectively 1) opening the lower entrance hole and simultaneously closing the upper entrance hole to form a roosting box, and 2) opening the upper entrance hole and simultaneously closing the lower entrance hole to form a nesting box.

16. The method of claim 15, including closing one entrance hole when opening the other entrance hole.

17. The method of claim 16, including providing a rotatable closure with an opening therein, rotating the closure between extreme positions wherein the opening in the closure aligns selectively with one of the entrance holes while closing the other entrance hole.

* * * * *